(12) United States Patent
Caps (10) Patent No.: US 9,975,686 B2
(45) Date of Patent: May 22, 2018

(54) VACUUM INSULATION PANEL AND CONTAINER COMPRISING VACUUM INSULATION PANELS

(71) Applicant: VA-Q-TEC AG, Würzburg (DE)

(72) Inventor: Roland Caps, Kleinwallstadt (DE)

(73) Assignee: VA-Q-TEC AG, Wurzburg (DE)

(*) Notice: Subject to any disclaimer, the term of this patent is extended or adjusted under 35 U.S.C. 154(b) by 66 days.

(21) Appl. No.: 15/124,958

(22) PCT Filed: Mar. 13, 2015

(86) PCT No.: PCT/EP2015/000554
§ 371 (c)(1),
(2) Date: Sep. 9, 2016

(87) PCT Pub. No.: WO2015/135656
PCT Pub. Date: Sep. 17, 2015

(65) Prior Publication Data
US 2017/0015488 A1    Jan. 19, 2017

(30) Foreign Application Priority Data

Mar. 13, 2014   (DE) .................... 20 2014 002 192 U (51) Int. Cl.
*B65D 81/38* (2006.01)
*F16L 59/065* (2006.01)
(Continued)

(52) U.S. Cl.
CPC ............ *B65D 81/3823* (2013.01); *B32B 7/12* (2013.01); *B32B 15/08* (2013.01); *B32B 15/20* (2013.01);
(Continued)

(58) Field of Classification Search
CPC ..... B65D 81/3823; F16L 59/065; B32B 7/12; B32B 15/08; B32B 15/20; B32B 27/10;
(Continued)

(56) References Cited

U.S. PATENT DOCUMENTS 4,662,521 A   5/1987   Moretti
4,668,551 A   5/1987   Kawasaki et al.
(Continued)

FOREIGN PATENT DOCUMENTS

DE          10058566       2/2002
DE          202004004187   6/2005
(Continued)

OTHER PUBLICATIONS

International Search Report, PCT/EP2015/000554, dated Jul. 7, 2015.

*Primary Examiner* — Michael C Miggins
(74) *Attorney, Agent, or Firm* — Andrus Intellectual Property Law, LLP (57) ABSTRACT

A vacuum insulation panel comprises a planar core having an open-pored material and an enclosure that surrounds the core on all sides in a close-fitting, complete and gas-tight manner. The enclosure has at least the following layers, listed in order from the inner layer next to the core to the outer layer: a sealing layer of polyethylene; a barrier layer assembly arranged thereon, the assembly comprising at least one metallized polyester film, EVOH film, metallized EVOH film, metallized PP film, or plastic film coated with alumina or silicon oxide; and at least one paper layer arranged on said assembly.

20 Claims, 5 Drawing Sheets

(51) Int. Cl.
*B32B 7/12* (2006.01)
*B32B 15/08* (2006.01)
*B32B 15/20* (2006.01)
*B32B 27/10* (2006.01)
*B32B 27/32* (2006.01)
*F25D 23/06* (2006.01)

(52) U.S. Cl.
CPC .............. *B32B 27/10* (2013.01); *B32B 27/32* (2013.01); *F16L 59/065* (2013.01); *F25D 23/06* (2013.01); *F25D 23/065* (2013.01); *B32B 2255/10* (2013.01); *B32B 2255/205* (2013.01); *B32B 2307/304* (2013.01); *B32B 2307/724* (2013.01); *B32B 2307/7242* (2013.01); *B32B 2439/40* (2013.01); *F25D 2201/14* (2013.01); *F25D 2331/804* (2013.01)

(58) Field of Classification Search
CPC ............... B32B 27/32; B32B 2255/10; B32B 2255/205; B32B 2307/304; B32B 2307/7242; B32B 2439/40; B32B 2307/724; F25D 23/06; F25D 2201/14; F25D 2331/804; F25D 23/065
See application file for complete search history.

(56) References Cited

U.S. PATENT DOCUMENTS

| | | |
|---|---|---|
| 5,262,375 A | 11/1993 | McKedy |
| 6,863,949 B2 | 3/2005 | Ehrmanntraut |
| 2005/0023731 A1 | 2/2005 | Kondo et al. |
| 2011/0120620 A1 | 5/2011 | Hiemeyer et al. |
| 2013/0149481 A1 | 6/2013 | Hiemeyer et al. |

FOREIGN PATENT DOCUMENTS

| | | |
|---|---|---|
| DE | 102005045726 | 4/2007 |
| DE | 102006028422 | 12/2007 |
| DE | 102010019074 | 11/2011 |
| EP | 0481730 | 4/1992 |
| WO | 2006/024937 | 3/2006 |

VACUUM INSULATION PANEL AND CONTAINER COMPRISING VACUUM INSULATION PANELS

CROSS-REFERENCE TO RELATED APPLICATIONS

This application is the U.S. national stage application of International Application PCT/EP2015/000554, filed Mar. 13, 2015, which international application was published on Sep. 17, 2015, as International Publication WO 2015/135656 in the English language. The International Application claims priority of German Patent Application No. 202014002192.9, filed Mar. 13, 2014. The international application and German application are both incorporated herein by reference, in entirety.

FIELD

The invention relates to a vacuum insulation panel and to a container comprising vacuum insulation panels.

BACKGROUND

Vacuum insulation panels are used for the efficient insulation of refrigerators and freezers, insulating transport containers for temperature-sensitive goods, for retrofit insulation in building renovation, etc.

A vacuum insulation panel has in principle a planar core made of open-pored material and an enclosure that surrounds the core on all sides in a close-fitting, complete and gas-tight manner. As a result, it is possible to evacuate the space within the enclosure and consequently to bring the thermal conductivity of the vacuum insulation panels to very low values.

The starting point for the teaching of the present invention is a known vacuum insulation panel (DE 10 2010 019 074 A1), in which the enclosure has at least one gas-tight barrier layer and a sealing layer on the inside of the barrier layer. This vacuum insulation panel comprises a planar core made of an open-pored material, a first barrier film resting on a first main surface of the core over a large area and having at least one sealing layer facing the core, a second barrier film, surrounding the core on its other main surface and likewise having a sealing layer, and a circumferential sealing seam, along which the two barrier films are sealed to one another with the aid of the sealing layers by means of thermal welding.

In the prior art on which the invention is based, it is explained that pressure-loadable materials in the form of powder boards, bulk powders, open-pored foams or glass fiber materials are suitable for the core. In particular, insulating cores made of powder boards or loose powders are conventionally further enclosed by an air-permeable polyester nonwoven in order to reduce the formation of dust, as emerges, for example, from DE 100 585 66 A1. Dust is therefore prevented from being liberated in the vacuum chamber during the evacuation operation and contaminating both the sealing seam and the vacuum chamber.

Core boards made of microporous silica powder have a very fine pore structure and permit relatively high gas pressures without the thermal conductivity of the residual gas playing any part. For example, in these microporous materials, a vacuum of only 1 to 10 mbar is needed to bring the thermal conductivity to 0.004 to 0.005 W/mK. Enclosures made of specific barrier films, which have only an extremely thin, vapor deposited coating of aluminum, ensure that the gas pressure in the core material rises at approximately only one mbar per year.

However, the previous manufacturing processes of vacuum insulation panels with powder filling necessitate a relatively high outlay and cannot be fully automated.

A method which comes relatively close to the demands of automation is described in DE 10 2005 045 726 A1 with the following method steps: a powder is put into a bag made of barrier film; a filter material that is air-permeable but not permeable to powder dust is fixed to the inside of the film bag, close to the opening, in such a way that the interior of the bag is sealed off in a dust-tight manner but air can still escape; the interior is evacuated and finally the bag is closed in the evacuated state.

The fine powder can be retained completely by the filter material applied in the bag opening even in the event of high gas flows in the bag during the evacuation, so that the evacuation space and the sealing seams are not contaminated. However, the method has the disadvantage that the evacuation operation lasts a relatively long time, since the evacuation can be carried out only via the narrow opening equipped with the filter nonwoven and having a relatively low flow cross section. In addition, as a result of the extraction on one side, a rather non-uniform distribution of the powder over the panel surface is produced.

In the first-named known vacuum insulation panel, on the other hand, the manufacture is carried out in a modified way, namely by a planar filter material resting on a second main surface of the core, opposite the first barrier film, over a large area, the second barrier film resting on the outer side of the planar filter material over a large area, and the filter material being welded all around into the sealing seam between the two barrier films.

Since the filter material does not rest just on one end surface of the core but over an entire main surface of the same, the evacuation can take place of the over the entire area of the filter nonwoven, so that a substantially more uniform distribution of the powder over the area is ensured but structures can also deliberately be introduced into the surface, for example steps of defined thickness.

In order to manufacture such a vacuum insulation panel, the loose powder or the powder board can be applied to a first barrier film; the filter material is placed thereon. The filter material is connected to the first barrier film at the edge which follows the later surface form of the vacuum insulation panel, so that a sealed volume is produced for the powder but, nevertheless, is permeable to air and, by virtue of its large area, permits considerably faster evacuation than previously.

In the previously extensively explained prior art, various measures are described for manufacturing vacuum insulation panels of the type under discussion. In particular, it is also explained that the planar core can be built up not only in one piece but also in many parts.

Comprehensive proposals are made for the configuration of the enclosure having the barrier films. Typically achievable gas permeabilities and water vapor permeabilities are described, and proposals are made for the selection of the materials for the barrier layers and the sealing layers.

All the statements in the prior art in this regard are intended also to be used in a corresponding way for the present invention, provided that they do not expressly contradict the following explanations. Thus, for the statements in this regard, full reference is made to the disclosure content of DE 10 2010 019 074 A1.

Vacuum insulation panels of the type under discussion have excellent insulating properties and a completely adequate period of use for many applications. Because of the low thickness of the enclosure, vacuum insulation panels of the type under discussion are delicate to handle, however. Care must be taken that the enclosure of the vacuum insulation panel is not damaged.

During the evacuation of the one-piece or multi-part planar core in the vacuum insulation panel, the air pressure of the surrounding atmosphere occasionally leads to the enclosure being forced non-uniformly into the core. As a result, corrugated surface structures are produced.

SUMMARY

The invention is based on the problem of configuring and developing the known, previously explained vacuum insulation panel in such a way that it is more stable overall.

The layer sequence of the enclosure of the vacuum insulation panel according to the invention is therefore relatively complex. From the inside to the outside, there is firstly a sealing layer made of polyethylene, over that a barrier layer assembly and at least one paper layer over the barrier layer assembly.

The barrier layer assembly is particularly specified in that it has at least one metalized polyester film, EVOH film, metalized EVOH film, metalized PP film, or plastic film coated with alumina or with silicon oxide. It can also have a plurality of film layers, also combined differently.

According to particularly preferred teaching, the paper layer on the outside is in turn covered and protected by a plastic outer layer or film. It is particularly preferred for the plastic outer layer to be implemented as an original coating of the paper layer. The plastic outer layer or film can particularly preferably consist of polyethylene.

The teaching of the invention is directed in particular to the fact that the enclosure on the outside of the barrier layer contains at least one paper layer, wherein the paper layer is arranged at least in a large planar part of the enclosure. The enclosure of the vacuum insulation panel according to the invention has a substantially higher rigidity where the barrier layer is combined with a paper layer than the enclosure in the case of previously known vacuum insulation panels. This results in a lower susceptibility to mechanical damage. In addition, the result is a smooth surface, since the enclosure stiffened by the paper layer cannot be forced so easily into the depressions in the planar core. The surface of the vacuum insulation panel of the invention is considerably smoother than the surface of known vacuum insulation panels.

It has been shown in practice that, by adapting the manufacturing method and manufacturing equipment, it is actually possible to manufacture vacuum insulation panels with a novel type of enclosure with only slightly higher outlay than known vacuum insulation panels. If appropriate, certain adaptations have to be made to the equipment (longer time and higher temperature when welding the sealing layers). Overall, however, production as in the case of known, non-paper-reinforced vacuum insulation panels is possible.

It is preferable if the paper layer has a grammage of 100 to 500 $g/m^2$, preferably of 200 to 300 $g/m^2$. In this case, the thickness of the enclosure where a paper layer is present increases to about 200 µm to 500 µm, where hitherto a thickness of at most 100 µm was achieved without such a paper layer, even in the case of a multi-layer enclosure.

For the ability to handle the vacuum insulation panel, the main surfaces of the one-piece or multi-part planar core and the enclosure thereof are particularly important. Accordingly, it is recommended that the paper layer is provided at least on one of the main surfaces. The paper layer is preferably provided on both mutually opposite main surfaces of the enclosure. Quite particularly preferably, the paper layer is provided everywhere in the enclosure.

For the manufacture of the vacuum insulation panel according to the invention, methods of manufacture which have also been described in the prior art are recommended. According to a first variant, a vacuum insulation panel is then configured in such a way that the enclosure consists of two planar enclosure parts, which are laid on each other with their sealing layers running around at the edge and are connected to each other in a gas-tight manner by sealing.

In another variant, the vacuum insulation panel according to the invention can be configured in such a way that the enclosure consists of a single planar enclosure part which is connected in a gas-tight manner at one end to a sealing seam running over a main surface or parallel to a main surface and is closed in a gas-tight manner at upper and lower sealing seams respectively running substantially transversely with respect to the first sealing seam.

For the ability to manufacture the vacuum insulation panel easily, preparation of the enclosure in such a way that the enclosure, in any case in the paper layers, is provided with pre-impressed depressions, embossing or the like at the envisaged fold lines, is recommended.

The high stiffness, the high mechanical resistance and the smooth surfaces of the vacuum insulation panels according to the invention even make it possible to use the vacuum insulation panels as load-bearing structures for containers or the like. The vacuum insulation panels according to the invention can become self-supporting elements and containers of the type under discussion, for example including refrigerators or freezers.

BRIEF DESCRIPTION OF THE DRAWINGS

The invention will now be explained in more detail below by using a drawing merely representing preferred exemplary embodiments. In the drawing.

DETAILED DESCRIPTION

The following explanation of exemplary embodiments of vacuum insulation panels according to the invention is to be understood by way of example. Preferred refinements and developments which are explained for an exemplary embodiment can in principle be used in all exemplary embodiments.

In particular, the modifications of core and enclosure of the vacuum insulation panel that are known from the prior art and are mentioned at the beginning of the present description can be used for the vacuum insulation panels according to the invention.

Figure 1:
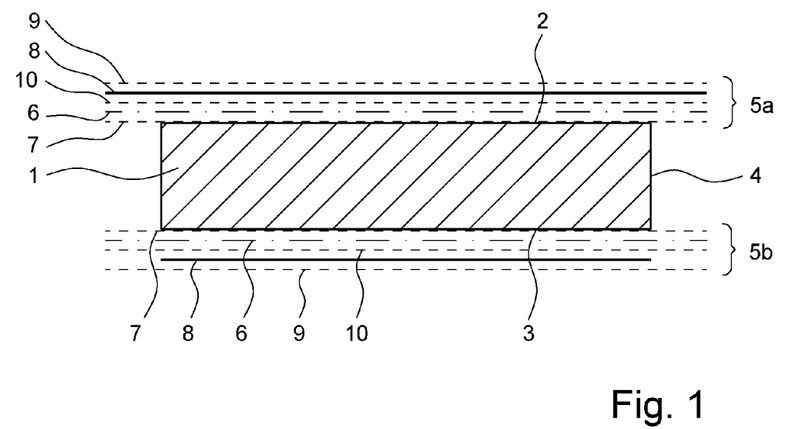
FIG. 1 shows a schematic sectional illustration of the layers of a vacuum insulation panel according to the invention in a type of exploded illustration.

FIG. 1 shows the basic structure of a vacuum insulation panel according to the invention. The shape of the finished vacuum insulation panel is initially determined by the shape of its planar core 1. This core 1 can be implemented in one piece, as illustrated. However, it can also be implemented in many parts, that is to say composed of multiple parts assembled together, or if appropriate even only laid over one another.

The core 1 is composed of a porous material, for example of pyrogenic silica, precipitated silica, perlite powder, micro-silica, silica from the recovery of vegetable wastes, mineral powders, organic powder materials or mixtures thereof. The core 1 is molded from such a powder, in particular by pressing. Here, it can either be appropriately pre-molded, for example pressed to form a board and/or cut out or punched out, or it is given its final shape only during the manufacturing method according to the invention from the initially loose powder. For the following explanation of the basic structure, the core 1 is to be viewed as given.

Otherwise, the core 1 does not have to be box-like or board-like but can have a largely arbitrary form, for example curved. Alternatively, it could have different thicknesses in different areas. In addition, cutouts or incisions and apertures are possible and structures could be impressed into its surface, for example grooves or the like.

In the following text, for reasons of simplicity, it will be assumed that the core 1 has a planar shape with a rectangular outline.

The core 1 is bordered by two mutually opposite, preferably mutually parallel, main surfaces 2, 3 and circumferential areas 4 running between the main surfaces 2, 3, for example consisting of four end sides.

In the simplified illustration in FIG. 1, the two main surfaces 2, 3 are congruent and in each case two mutually opposite end sides are likewise parallel to each other, equally large and each run respectively perpendicular to the main surfaces 2, 3. Therefore, the core 1 here has a constant thickness.

In the finished state, the planar one-piece or multi-part core 1 of the vacuum insulation panel is enclosed on all sides in a close-fitting, complete and gas-tight manner by an enclosure 5. The enclosure 5 is gas-tight in order that the vacuum in the enclosed space is maintained over many years. At this point, reference may be made expressly to the explanations in the introduction to the description. They also apply to the present illustration.

As FIG. 1 shows schematically, the enclosure 5 firstly has at least one gas-tight barrier layer 6 and, on the inside of the barrier layer 6, a sealing layer 7. The barrier layer 6 or barrier layer assembly 6 will be explained in detail further below. The sealing layer 7 is, for example, a polyethylene film. This will also be explained in detail further below.

Typically, the closure of the enclosure 5 with the aid of the sealing layers 7 is carried out by thermal welding of the plastic material of the sealing layers 7.

FIG. 1 further reveals that, in accordance with the teaching of the invention, the enclosure 5 on the outer side of the barrier layer 6 also has at least one paper layer 8. The paper layer 8 is arranged in at least a large, planar part of the enclosure 5. The result of the paper layer 8 is that the enclosure 5 is stiffer in this area than in the prior art and less susceptible to mechanical stress. The surface in the area of the paper layer 8 is smooth, since the greater stiffness of the enclosure 5 in this area leads to the enclosure 5 not readily being forced under atmospheric pressure into smaller grooves or cracks in the core 1.

Provision is preferably made for the paper layer 8 to have a grammage of 100 to 500 g/m$^2$, preferably of 200 to 300 g/m$^2$.

The exemplary embodiment illustrated in FIG. 1 shows, schematically at the top, the enclosure 5a with a paper layer 8 projecting laterally over the edge of the first main surface 2. By contrast, the enclosure 5b illustrated at the bottom in FIG. 1 shows a paper layer 8 which, on the right and left, reaches only as far as the edge of the second main surface 3 of the core 1.

In general, it is true that the paper layer 8 is preferably provided at least on one of the main surfaces 2, 3, preferably on both main surfaces 2, 3 and/or preferably also on the circumferential surfaces 4.

As illustrated schematically in FIG. 1, the enclosure 5 can have two paper layers 8 separated from each other in two enclosure parts 5a, 5b. However, it is also possible to arrange multiple paper layers 8 at various points of the enclosure 5 if it is wished to achieve special effects.

FIG. 1 shows the further structure of the preferred exemplary embodiment of a vacuum insulation panel according to the invention. Here, provision is further made for the enclosure 5 to have an outer layer 9, preferably a polyolefin outer layer, on the outside of the paper layer 8.

Furthermore, FIG. 1 shows that, in the exemplary embodiment that is illustrated and preferred, the enclosure 5 has an intermediate layer 10, preferably a polyolefin intermediate layer and/or an adhesive layer, between the barrier layer 6 and the paper layer 8.

In the exemplary embodiment illustrated in FIG. 1 and to this extent particularly preferred, the polyolefin layers are preferably PE films, illustrated by dashed lines. PE films are also the sealing layers 7. The barrier layers 6 are illustrated by dash-dotted lines. The paper layers 8 are illustrated by continuous lines.

For the barrier layer assembly 6, provision is made for this to comprise one or more layers of the following films: metalized polyester film, EVOH film, metalized EVOH film, metalized PP film, plastic film coated with alumina or with silicon oxide.

In a complete embodiment as shown in FIG. 1, the enclosure 5 has a thickness overall between about 200 μm and 500 μm, depending on the chosen thickness of the paper layer 8.

For the sealing layers 7, polyethylene films are preferably considered. In particular, it is possible to provide sealing layers 7 of LDPE, HDPE, but possibly also of PP or EVOH. Expediently, as in the prior art, thermal welding with the sealing layers 7 lying immediately on one another is also implemented.

The connection of barrier layer 6 and paper layer 8 is carried out, as previously mentioned, by a polyolefin intermediate layer 10 or else by an adhesive layer, for example by a PU adhesive.

It is also possible to provide for the enclosure 5 to be coated with a fire-retardant or finished in another way, either directly on the paper layer 8 or entirely on the outside.

The use of filter materials, in particular a filter nonwoven made of polyester, polyethylene, paper or cellulose, which is arranged on the inside of the enclosure 5, has already been mentioned in the introduction to the description. For this purpose, for details reference may be made to the prior art explained at the beginning, to the full extent of which reference is made here for the purposes of the disclosure.

Figure 2A:
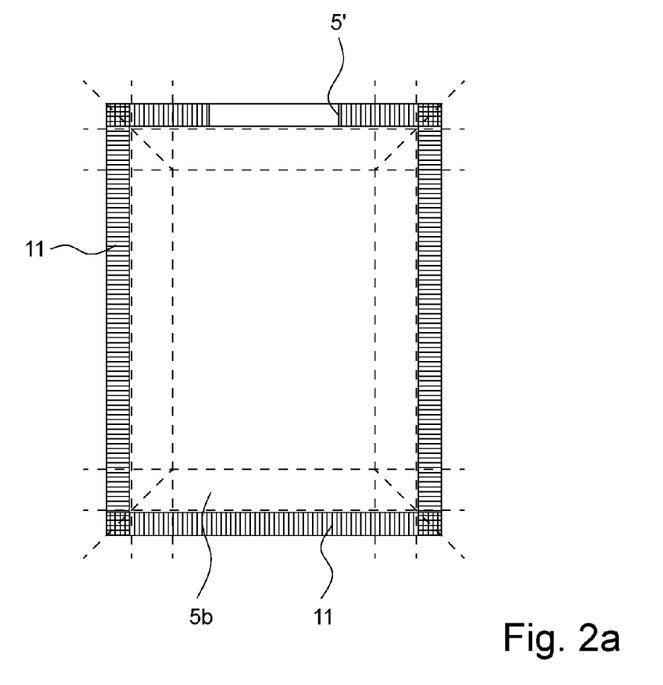
FIGS. 2a-c show three illustrations relating to the manufacture of a preferred exemplary embodiment of a vacuum insulation panel according to the invention.
Figure 2B:
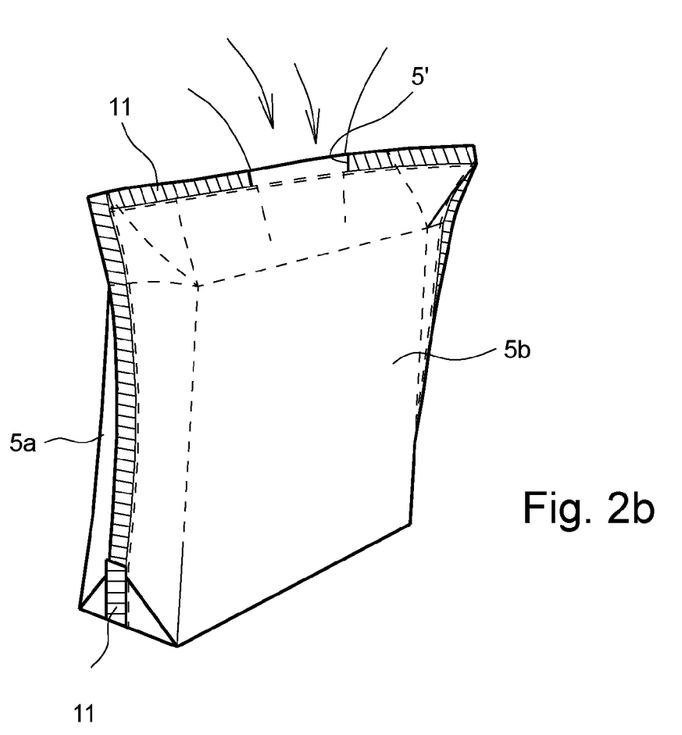
Figure 2C:
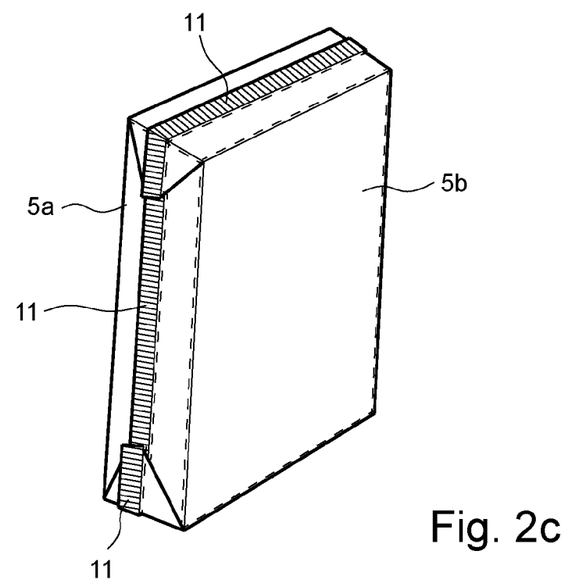
Figure 3A:
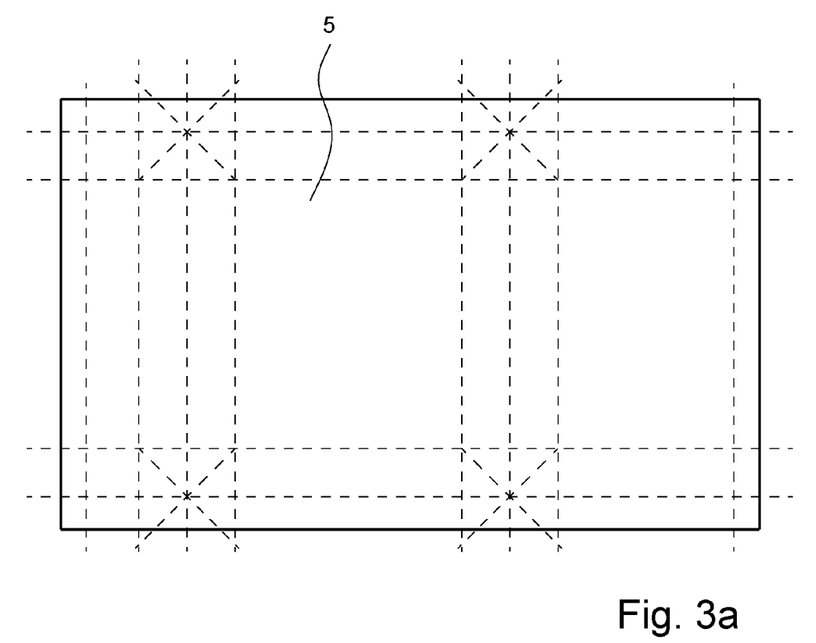
FIGS. 3a-d show four illustrations relating to the manufacture of a further exemplary embodiment of a vacuum insulation panel according to the invention.
Figure 3B:
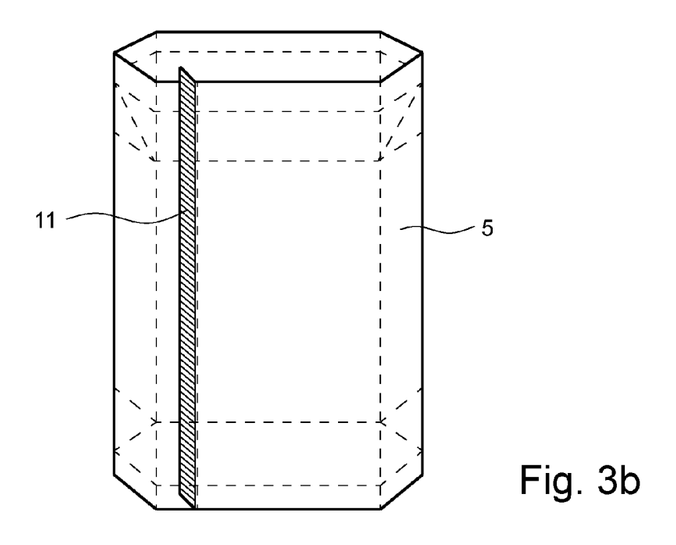
Figure 3C:
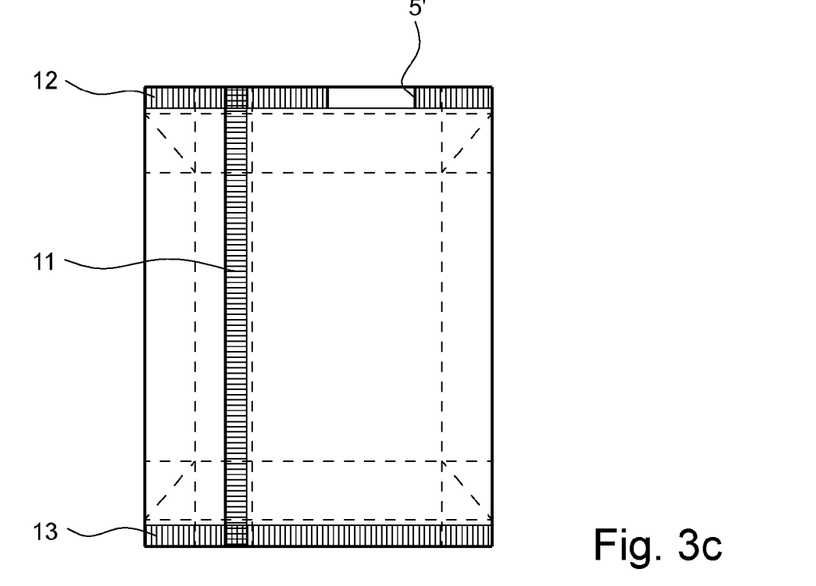
Figure 3D:
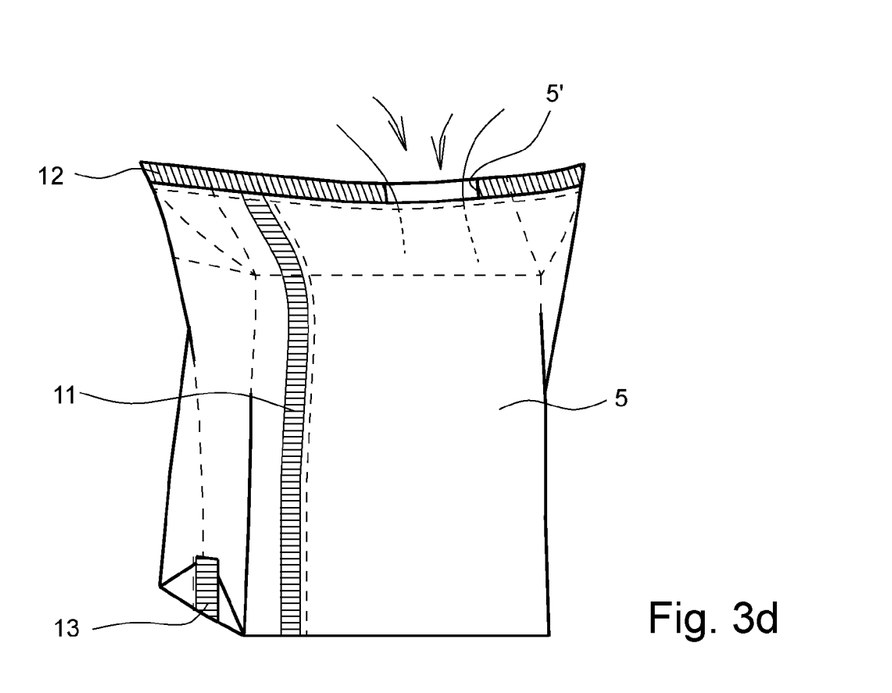

FIGS. 2a-c show a preferred embodiment of a vacuum insulation panel during its manufacture. Here, provision is made for the enclosure 5 to consist of two planar enclosure parts 5a, 5b, which are laid on each other with their sealing layers 7 running around at the edge and are connected to each other in a gas-tight manner by sealing.

In FIG. 2a, it is possible to see the enclosures 5 laid flat on each other, which are thermally welded directly to one another by the sealing layers 7 thereof and form circumferential sealing seams 11 except in an area of a filler opening 5' provided on the upper edge of the enclosure 5.

FIG. 2b shows the filling operation (arrows) with the powdery material for the core 1.

The interior of the enclosure 5 is then evacuated. The core 1 and therefore the entire vacuum insulation panel is given the form illustrated in FIG. 2c by means of appropriate shaping (possible pressing). The sealing seams 11 are closed circumferentially to completely seal the enclosure 5.

FIGS. 3a-d show, in an illustration corresponding to FIGS. 2a-c, the manufacturing path of the vacuum insulation panel in which the enclosure 5 consists of a single planar enclosure part.

The enclosure 5 consists of a single planar enclosure part, which is connected in a gas-tight manner at one end to a first sealing seam 11 running over a main surface 2 to form a sleeve (FIG. 3b), and is closed in a gas-tight manner respectively at upper and lower sealing seams 12, 13 running substantially transversely with respect to the first sealing seam 11.

It is obvious that the folds of the enclosure 5 should be prepared where, according to the invention, there are paper layers 8. Accordingly, it is recommended that the enclosure 5 be provided with pre-impressed depressions, embossing or the like at the envisaged fold lines, in any case where there is a paper layer 8 in the enclosure 5. This is indicated in FIGS. 2a-c and 3a-d by dashed lines.

Figure 4:
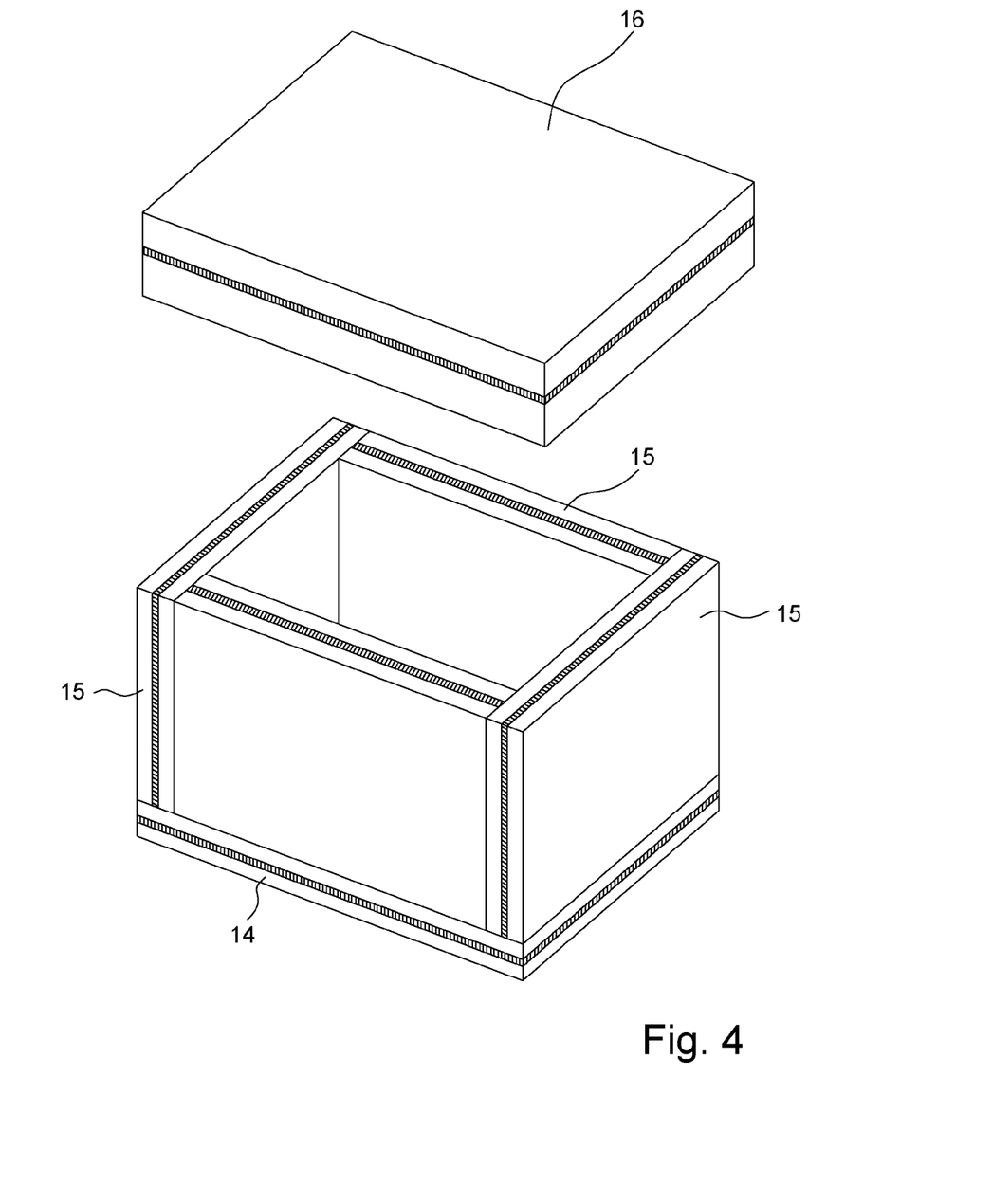
FIG. 4 shows a schematic illustration of a container built up from vacuum insulation panels according to the invention.

FIG. 4 shows, finally, the further preferred teaching of the invention in the form of a container with a base 14, side walls 15 and cover 16, the cover 16 being openable as a lid and/or a side wall 15 being openable as a door. The special feature with this container is that the base 14 and/or the side walls 15 and/or the cover 16 comprises or comprise one or more vacuum insulation panels of the type described previously and, preferably, are implemented as load-bearing elements. Because of the resistance of the vacuum insulation panels according to the invention, the latter can be used directly here as constructional elements for the container.

As regards the construction of corresponding containers, these can be used purely passively in a temperature-controlled manner with freezer packs, for example made of phase-changing material. However, it is also possible to operate a corresponding container actively with a cooling unit, all known per se from the prior art.

It has been shown that, with the vacuum insulation panel according to the invention, it is possible to achieve excellent characteristics. In particular, it is possible to achieve permeation of air through the casing at room temperature of less than 100 mbar liter per m$^2$ panel surface and year, preferably less than 10 mbar liter per m$^2$ panel surface and year and particularly preferably less than 2 mbar liter per m$^2$ panel surface and year, and/or permeation of water vapor through the casing at room temperature of less than 100 g per m$^2$ panel surface and year, preferably less than 10 g per m$^2$ panel surface and year and particularly preferably less than 2 g per m$^2$ panel surface and year.

All embodiments disclosed herein can be used alone or in combination with each other.

The invention claimed is:

1. A vacuum insulation panel comprising
a planar core made of an open-pored material and an enclosure that surrounds the core on all sides in a close-fitting, complete and gas-tight manner,
wherein the enclosure, listed in order from the inside at the core toward the outside, has at least the following layers:
a sealing layer made of polyethylene, covered by a barrier layer assembly having at least one metalized polyester film, EVOH film, metalized EVOH film, metalized PP film, or plastic film coated with alumina or with silicon oxide, and at least one paper layer covering the barrier layer assembly.

2. The vacuum insulation panel as claimed in claim 1, wherein
the enclosure comprises two planar enclosure parts, each having a sealing layer, the enclosure parts being laid on each other with the sealing layers running around a peripheral edge and being secured to each other in a gas-tight sealed connection.

3. The vacuum insulation panel as claimed in claim 1, wherein the enclosure comprises a single planar enclosure part which is connected in a gas-tight manner at one end to a first sealing seam running over a main surface or parallel to a main surface and is closed in a gas-tight manner at upper and lower sealing seams respectively running substantially transversely with respect to the first sealing seam.

4. The vacuum insulation panel as claimed in claim 1, wherein the at least one paper layer is configured to provide stiffness to the enclosure.

5. The vacuum insulation panel as claimed in claim 1, wherein the enclosure has a thickness in the range of 200 μm to 500 μm.

6. The vacuum insulation panel as claimed in claim 1, wherein the enclosure is coated with a fire-retardant material.

7. The vacuum insulation panel as claimed in claim 1, wherein at least one plastic outer layer or film is provided over the paper layer.

8. The vacuum insulation panel as claimed in claim 7, wherein the plastic outer layer or film consists of polyethylene.

9. The vacuum insulation panel as claimed in claim 7, wherein the plastic outer layer is configured as a coating of the paper layer.

10. The vacuum insulation panel as claimed in claim 1, wherein the paper layer has a grammage of 100 to 500 g/m$^2$.

11. The vacuum insulation panel as claimed in claim 10, wherein the grammage is 200-300 g/m$^2$.

12. The vacuum insulation panel as claimed in claim 1, wherein
the core and the enclosure have two mutually opposite, main surfaces and circumferential surfaces running between the main surfaces, and
the paper layer is provided at least on one of the main surfaces.

13. The vacuum insulation panel as claimed in claim 12, wherein the main surfaces are parallel, and the paper layer is provided on at least one of both main surfaces and on the circumferential surfaces.

14. The vacuum insulation panel as claimed in claim 12, wherein the paper layer is provided on both main surfaces, the paper layer on one of the main surfaces extending between opposite edges thereof and the paper layer on the other of the main surfaces extending beyond opposite edges thereof.

15. The vacuum insulation panel as claimed in claim 1, wherein
the enclosure has an intermediate layer between the barrier layer assembly and the paper layer.

16. The vacuum insulation panel as claimed in claim 15, wherein the intermediate layer is configured as at least one of a polyolefin intermediate layer and an adhesive layer.

17. The vacuum insulation panel as claimed in claim 1, wherein
the enclosure is provided with pre-impressed formations, in locations provided with the paper layer in the enclosure.

18. The vacuum insulation panel as claimed in claim 17, wherein the pre-impressed formations are provided at fold lines formed in the paper layer.

19. The vacuum insulation panel as claimed in claim 17, wherein the pre-impressed formations are configured as depressions or embossing.

20. A container comprising
a base, side walls and a cover, with at least one of the cover being openable as a lid or a side wall being openable as a door, wherein
at least one of the base, the side walls, and the cover comprises one or more vacuum insulation panels wherein each vacuum insulation panel comprises
a planar core made of an open-pored material and an enclosure that surrounds the core on all sides in a close-fitting, complete and gas-tight manner,
wherein the enclosure, listed in order from the inside at the core toward the outside, has at least the following layers:
a sealing layer made of polyethylene, covered by a barrier layer assembly having at least one metalized polyester film, EVOH film, metalized EVOH film, metalized PP film, or plastic film coated with alumina or with silicon oxide, and at least one paper layer covering the barrier layer assembly, and
wherein the one or more vacuum insulation panels are configured as load-bearing elements.

* * * * *